Nov. 17, 1953  E. O. HOWLE ET AL  2,659,521
APPARATUS FOR TREATING AND BAGGING PERLITE AND THE LIKE
Filed Dec. 26, 1947
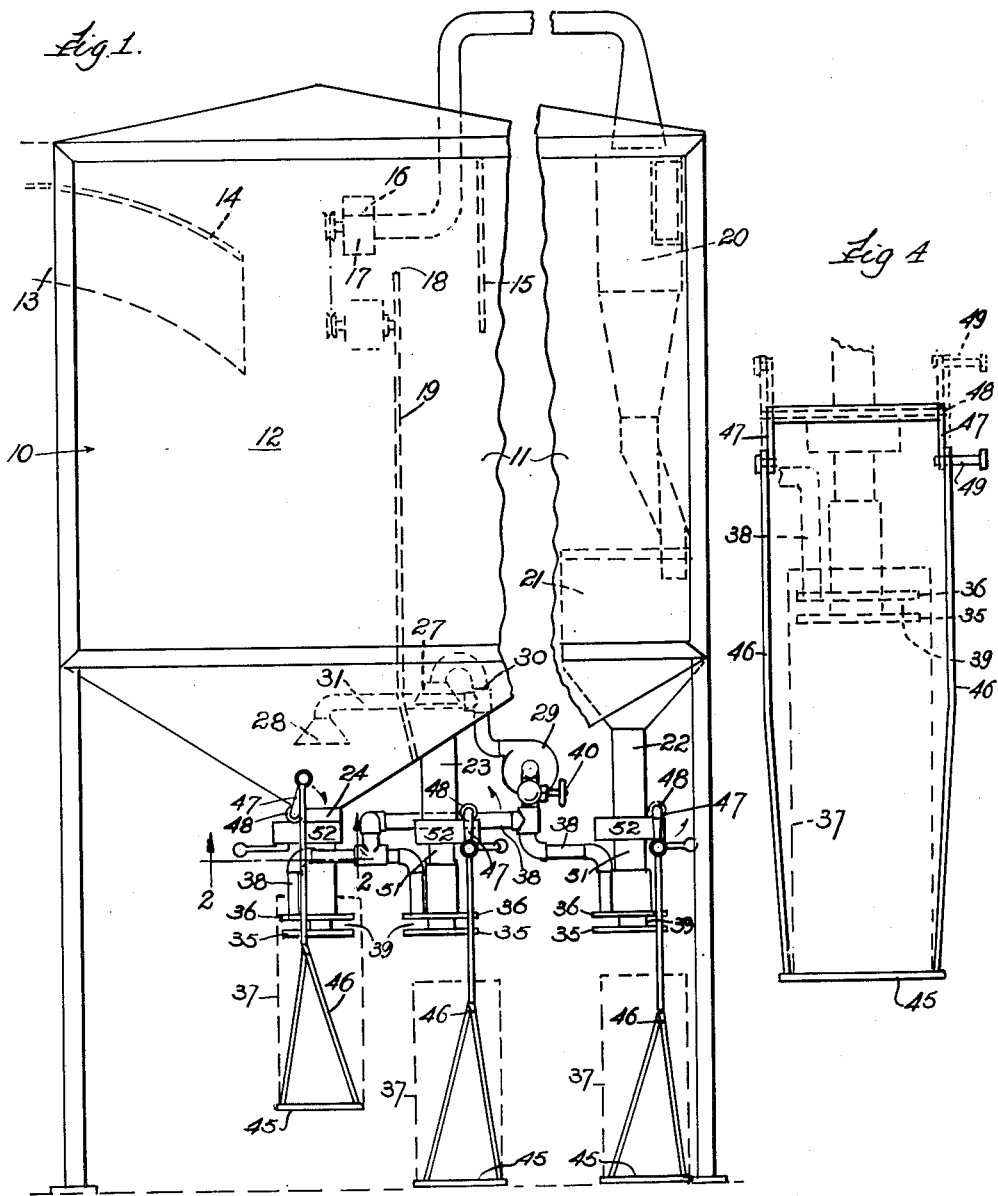
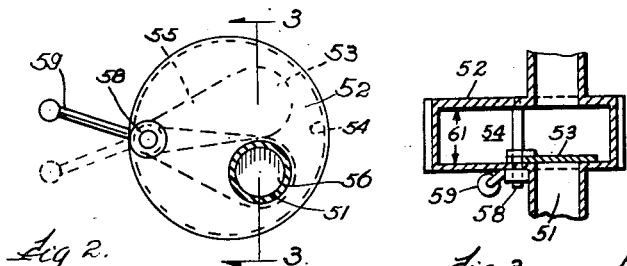

Patented Nov. 17, 1953

2,659,521

UNITED STATES PATENT OFFICE 2,659,521

APPARATUS FOR TREATING AND BAGGING PERLITE AND THE LIKE

Ernest O. Howle and Roger W. Jackson, Chicago, Ill., and Norman M. Foster, New Castle, Ind.; said Jackson and said Foster assignors to said Howle Application December 26, 1947, Serial No. 793,926

4 Claims. (Cl. 226—70)

This invention relates to the handling and treatment of granular insulating material and the like, and among other objects aims to provide a method and apparatus for cooling highly heated material to permit subsequent handling.

Another object aims to provide means for removing and recovering dust incident to the bagging or packaging of the granular material.

A further object is to treat such materials as perlite to remove or reduce acidity.

Other objects and the nature of the invention may be readily understood by reference to one illustrative method and apparatus embodying the invention described in the following specification and illustrated in the accompanying drawing.

Fig. 1 is an elevation (broken to permit illustration on a larger scale) of the storage bin and associated filling and cooling apparatus;

Fig. 2 is a section taken on the plane 2—2 of Fig. 1 to illustrate the control valve of the filling apparatus;

Fig. 3 is a section of the control valve taken on the plane 3—3 of Fig. 2; and

Fig. 4 is an elevation on a larger scale, of the elevating apparatus, showing the filling spout and associated details in dotted lines.

The invention may be advantageously described in connection with expanded perlite although it will be understood that some phases of the invention are applicable to other materials involving one or more of the problems incident to the treatment and handling of perlite. Perlite is a siliceous or acid lava, and chemically is rhyolitic in composition. It contains about 2 to 5% of "combined" water. When quickly heated to its softening temperature range the steam formed puffs the material to many times its original size to produce a material of very low bulk density, e. g. 2 to 14 pounds per cubic foot depending on the degree and efficiency of expansion and the source of the material. The softening range is generally somewhere between 1600 degrees F. and 2600 degrees F. Its chemical composition renders perlite somewhat acid in reaction.

In our copending application Serial No. 774,614 filed September 17, 1947, now Patent Number 2,572,484, dated October 23, 1951, of which this application is a continuation in part, we disclosed and claimed a method of expanding perlite and other intumescing materials such as vermiculite. As delivered from the expander into the storage bins the perlite is in highly heated condition, and because of its high insulating efficiency a mass of such particles cools very slowly, making it dangerous and difficult to handle, and burning bags or other containers for packaging it.

According to the illustrative method cool air is passed through the mass of heated granules, in this case while the latter are in the storage bin. The air not only cools the granules sufficiently for handling, but (in the case of perlite and other acidic materials) by contact with the granules in their highly heated and reactive condition, reduces or eliminates by oxidation or otherwise, the acidity of the granules. The intake for the air so used is advantageously located at a point or points adjacent discharge of granules from the bins so as to carry with it the dust arising from the fall of the materials into bags or other packaging means.

We have omitted from the present application a disclosure of apparatus for expanding the perlite or other intumescing material. Any appropriate apparatus such as that disclosed in our above identified copending application may be employed. It will be understood that the expanded perlite is delivered in highly heated condition from the expanding apparatus to a storage bin 10 which may advantageously be similar to that disclosed in said copending application wherein the bin is divided into two compartments 11 and 12 for the so-called "medium" and "heavy" materials respectively. As here shown the material enters the bin through the opening 13 at a point adjacent its top along with the hot expanding gases. Preferably a shield 14 similar to an inverted trough directs the material downwardly into the bin and protects the upper portion of the bin from the high temperatures of the hot gases. A suction fan 16 withdraws the fine dust remaining in suspension. The suction inlet for the fan is connected to the bin at a point 17 adjacent the top of the bin to remove only the extremely fine material which remains in suspension in the gases after their velocity has been substantially reduced. Only the medium sized materials carried by the gases pass over the upper edge 18 of baffle 19 located in the path of the material discharged into the bin. Baffle 15 absorbs the energy of the granules striking it, leaving only the very fine material in suspension, to be withdrawn by fan 16. Baffle 15 also acts as a shield to protect the walls of the bin from direct impact of the heated granules. The heavier materials cannot clear the baffle and remain in compartment 11 which is separated from compartment 12 by baffle 19. The medium grade material which is carried over the baffle but is not sufficiently fine to remain suspended in the current of gases when the latter lose their high velocity, falls to the bottom of compartment 11 and constitutes the so-called "medium" size material. Such material has a maximum mesh size of minus 8 and weighs about 4 to 5 pounds per cubic foot. The "heavy" material in compartment 12 has a maximum mesh size of minus 4 and weighs about 7 to 8 pounds per cubic foot.

The very fine material which has a maximum mesh size roughly of minus 50 but mainly comprises extremely fine particles weighs about 2½ to 3 pounds per cubic foot. It is withdrawn through the opening 17 into cyclone separator or other settling means 20 where it is collected. The cyclone separator located outside bin 10 and shown in dotted line in Fig. 1, discharges by gravity into a compartment or bin 21 which is provided with a discharge spout 22. Similarly, compartments 11 and 12 are provided with discharge spouts 23 and 24 respectively.

The handling which the fine material receives in passing from the main bin into the cyclone separator where it whirls around, is sufficient to cool the material in bin 21 to a temperature where it will not burn or scorch the bags or other containers. The material in compartments 11 and 12 is however very hot and is cooled by discharging cool air therein from the inverted conical outlets 27 and 28 respectively which are submerged in the mass of granules. The cool air is supplied by fan 29 connected to the outlets 27 and 28 by pipes 30 and 31. The cool air passing through the mass of granules not only cools them, but in the case of perlite (which is a siliceous or acid lava), oxidizes or carries off the acid, thus adapting the perlite to be used for many purposes for which perlite not so treated would be unsuitable. The highly heated condition of the perlite at the time of its contact with the air makes it sufficiently reactive to insure removal or substantial reduction of the acid content of the perlite.

The suction side of the fan 29 is advantageously associated with the bag filling spouts 22, 23 and 24 to withdraw the dust created on the fall of the material into bags or other containers. As here shown the respective discharge spouts are equipped for filling bags and are provided at their extremities with a pair of spaced discs 35 and 36 whose diameter is slightly less than that of the diameter of the bag 37 or other container to provide a space for the inlet of air withdrawn by the fan through pipes 38, and to prevent collapsing the container by suction. Dust on rising from the bag and passing the edges of discs 35 encounters the low pressure (suction) existing in the space 39 between the discs and this is withdrawn through its suction pipe 38 to the fan (instead of escaping to the atmosphere) and eventually discharged into the bin. If it remain in suspension in the air, it is eventually withdrawn from the bin through outlet 17 by fan 16. To prevent collapse of the bag or other flexible container by reason of excessive suction created by fan 29, the suction pipe is provided with a bypass valve 40 which may be adjusted manually or automatically to regulate the vacuum in space 39 to some value less than sufficient to collapse the bag or draw it tightly about the discs 35 and 36.

Each discharge spout is advantageously provided with an elevator for raising the bag or other container about the discs surrounding the end of the spout. The elevator is here shown in the form of a platform 45 supported by rods or flexible links 46 leading to cranks 47 on shaft 48. Rotation of shaft 47 elevates or lowers platform 45 to raise the bag to and lower it from, filling position (see Figs. 1 and 4). In the present instance, the cranks project from the end of the shaft (Fig. 4) and one crank is provided with a handle 49 for rotating the shaft to elevate platform 45. By rotating the cranks (in their upper position) slightly beyond vertical dead center (in which position they are held by engagement of one or both cranks with the links 46, see Fig. 4), the platform will remain in elevated position until the crank is rotated in the reverse direction past dead center.

The elevator is advantageously adjusted so that in relation to the lower disc 35 that portion of the bag or other container below the disc will contain approximately the volume of the material it is desired to discharge into the bag. This may be either 3 or 4 cubic feet for bags. The filling continues until the material reaches the level of lower disc 35, contact of the material with which arrests further filling. On lowering the bag the material remaining in that portion 51 of the space below the control valve 52, will run into the bag, thereby completely filling the bag. The volume of portion 51 of the spout is preferably designed to contain a predetermined volume of material, e. g. 1 cubic foot, as in the present case, wherein the diameter of the spout is 4 inches.

Control valve 52 (Figs. 2 and 3) is advantageously designed to operate without binding or clogging by collection of material inside the valve. In the present case the valve comprises a disc 53 located inside housing 54 interposed in the spout 24. The lateral dimensions of the housing are sufficient to permit the valve disc to be swung to open position 55 (Fig. 2) to clear the opening 56 into the lower section 51 of spout. In the present instance the disc is pivoted at 58 and operated by handle 59. The vertical dimension 61 (in this case 4 inches) of housing 54 is sufficient in conjunction with its lateral extent to prevent binding of the valve by packing of the material around the valve. The material is unable (partly by reason of its angle of repose) to fill the housing completely, and therefore packing of material around the valve is impossible. On the other hand the depth of the housing is sufficient so that repeated movement of the valve does not act to pack the material in the housing. Instead it remains relatively loose permitting free operation of the valve.

In operation the elevator is manipulated to raise the bag or other container into filling position below the lower disc 35. Thereafter the valve is opened and material runs into the bag until its flow is interrupted by engagement with the lower disc 35. Thereupon valve 53 is closed. Upon lowering of the elevator and the bag the volume of material in the lower section 51 of the spout runs into the bag thus filling the bag with the desired volume of material. The cooling effected by fan 29 leaves the material running into the bag sufficiently cool to permit handling and to prevent scorching or burning of the bag.

Obviously the invention is not limited to the details of the illustrative apparatus since these may be variously modified. Moreover it is not indispensable that all features of the invention be used conjointly since various features may be used to advantage in different combinations and sub-combinations.

Having described our invention, we claim:

1. In apparatus for expanding perlite and the like the combination comprising a bin, means for discharging freshly expanded granules into the bin, a discharge spout leading from the bottom of the bin, an air conduit in said bin having its discharge orifice arranged to discharge cooling air in the interior of the pile of granules in the bin, said discharge spout having an outlet arranged to discharge granules into a packaging container, a suction fan having an inlet adjacent said spout outlet to carry away dust arising from the discharge from said spout, said fan being connected with said air conduit to discharge air and the dust carried thereby into the interior of the pile of granules in said bin.

2. In apparatus for expanding perlite and the like the combination comprising a bin, means for discharging freshly expanded granules into the bin, a discharge spout leading from the bottom of the bin, an air conduit in said bin having its discharge orifice arranged to discharge cooling air in the interior of the pile of granules in the bin, said discharge spout having a pair of spaced discs of an area to fit inside a container to be filled from said spout, said discs fitting loosely in the container to provide an air space between them and the walls of the container, and a suction fan having its inlet connected with the space between said discs to withdraw dust arising from the material falling into the container, and means for recovering the dust thus carried away.

3. In apparatus for expanding perlite and the like the combination comprising a bin, means for discharging freshly expanded granules into the bin, and a discharge spout leading from the bottom of the bin, an air conduit in said bin having its discharge orifice arranged to discharge cooling air in the interior of the pile of granules in the bin, said discharge spout having a pair of spaced discs of an area to fit inside a container to be filled from said spout, said discs fitting loosely in the container to provide an air space between them and the walls of the container, and a suction fan having its inlet connected with the space between said discs to withdraw dust arising from the material falling into the container, said fan discharging into said air conduit.

4. In apparatus for expanding perlite and the like the combination comprising a bin, means for discharging freshly expanded granules into the bin, a discharge spout leading from the bottom of the bin, an air conduit in said bin having its discharge orifice arranged to discharge cooling air in the interior of the pile of granules in the bin, said discharge spout having an outlet arranged to discharge granules into a packaging container, a suction fan having an inlet adjacent said spout outlet to carry away dust arising from the discharge from said spout, said fan being connected with said air conduit to discharge air and the dust carried thereby into the interior of the pile of granules in said bin, and a by-pass air valve in said fan suction to regulate the degree of suction at said spout.

ERNEST O. HOWLE.
ROGER W. JACKSON.
NORMAN M. FOSTER.

References Cited in the file of this patent

UNITED STATES PATENTS

| Number | Name | Date |
|---|---|---|
| 988,671 | Staunton | Apr. 4, 1911 |
| 1,397,061 | Smith | Nov. 15, 1921 |
| 1,437,876 | Tyler | Dec. 5, 1922 |
| 1,618,459 | Marsh | Feb. 22, 1927 |
| 1,782,733 | Lilly | Nov. 25, 1930 |
| 1,880,895 | Dorrington et al. | Oct. 4, 1932 |
| 1,910,793 | Guinan | May 23, 1933 |
| 1,934,016 | Strehs | Nov. 7, 1933 |
| 1,957,875 | Wright | May 8, 1934 |
| 1,972,026 | Miller | Aug. 28, 1934 |
| 2,136,224 | Weinreich | Nov. 8, 1938 |
| 2,167,438 | Kaufman | July 25, 1939 |
| 2,255,206 | Duncan | Sept. 9, 1941 |
| 2,275,770 | Kilner | Mar. 10, 1942 |
| 2,306,462 | Moorman | Dec. 29, 1942 |
| 2,309,036 | Beardsley | Jan. 19, 1943 |
| 2,318,576 | Arnold | May 11, 1943 |
| 2,335,732 | Bowen | Nov. 30, 1943 |
| 2,336,378 | Uhlig | Dec. 7, 1943 |
| 2,387,452 | Lundal et al. | Oct. 23, 1945 |
| 2,422,330 | Allerdice | June 17, 1947 |
| 2,452,935 | Kemp | Nov. 2, 1948 |
| 2,509,985 | Morrow | May 30, 1950 |

FOREIGN PATENTS

| Number | Country | Date |
|---|---|---|
| 425,072 | Germany | Feb. 10, 1926 |